3,169,938
PREPARATION OF PRODUCTS OF HIGH MOLECULAR WEIGHT FROM FORMALDEHYDE BY POLYMERIZING IN THE PRESENCE OF AN INERT SOLID
Johannes J. M. Evers and Paul J. Hodzelmans, both of Sittard, and Theodorus H. Linders, Urmond, Netherlands, assignors to Stamicarbon N.V., Heerlen, Netherlands
No Drawing. Filed Jan. 15, 1960, Ser. No. 2,582
Claims priority, application Netherlands, Jan. 20, 1959, 235,301
11 Claims. (Cl. 260—37)

The present invention relates to the preparation of products of high molecular weight from formaldehyde.

From U.S. Patent 2,768,994 it is known that products of high molecular weight can be prepared from formaldehyde by introducing the formaldehye into an inert liquid vehicle, in which a catalyst, e.g. an amine, preferably has been dissolved. In this way, high molecular weight formaldehyde polymers which are suitable for practical use are obtained. However, the output is low, generally less than 75% by weight, in respect of the formaldehyde introduced.

According to the present invention, it has now been found that in the preparation of products of high-molecular weight by polymerization of formaldehyde, as in the case of U.S. 2,768,994, a rapid polymerization with an almost quantitative output can be reached, if the formaldehyde is introduced into a suspension of solid material in an inert liquid vehicle. Even more improved results are obtained if the formaldehyde is distributed in the suspension, e.g. by the application of a distributing device and/or by stirring, so that a good contact of the formaldehyde with the solid material is obtained.

As inert vehicles for use herein, well-known liquids which do not react with formaldehyde may be used. Suitable vehicles include, for example, saturated hydrocarbons, such as pentane, hexane, heptane, decane, cyclopentane, cyclohexane, methyl cyclohexane, decahydronaphthalene, or mixtures thereof, and aromatic hydrocarbons, such as benzene, toluene and xylene. Halogenated or nitrated hydrocarbons and other inert liquids, such as ethers, nitriles and acetals may also be used.

By contacting the formaldehyde with the solid material suspended in the vehicle, the formaldehyde is polymerized to products of high molecular weight. In this polymerization, the temperature may be varied within wide limits. If the working temperature is below 0° C., e.g. —10 or —25° C., proper cooling and discharge of the reaction heat must be provided for. Easy operations are possible at room temperature or at a somewhat higher temperature, e.g. 25°, 30° or 50°, while, if desired, still higher temperatures, such as 70°, 80° or 100° C., or even higher, may be applied.

The pressure utilized may also be varied. Conveniently, the process may be carried out at atmospheric pressure or at a slight overpressure, e.g. 2, 3, 5 or 10 atm., or even higher.

The introduction of formaldehyde into the suspension may be carried out in various ways. For example, the formaldehyde may be added at such a rate that non-converted formaldehyde escapes from the suspension. In a cyclic or continuous process, non-converted formaldehyde may then be re-used.

However, the formaldehyde is preferably introduced into the suspension at a rate which, according to the nature and the amount of solid material in the suspension, as will be further elucidated below, is so adjusted that practically no formaldehyde escapes from the suspension. In this way, complete conversion of the formaldehyde into products of high molecular weight can be attained in a simple way, e.g. in a continuous manner.

The solid material suspended in the vehicle may vary widely in nature and properties. If the solid material used for preparing the suspension is discharged from the polymerization zone and separated from the vehicle together with the formaldehyde polymer formed, mixtures of formaldehyde polymer and the solid material used for the suspension are obtained as final products. The properties of the final products, and also the properties of the articles made from them, depend on the properties and amount of the solid material used. Usually, from 0.1 to 100 grams by weight of solid material per one liter of vehicle are used although proportions outside this range are also suitable.

The process according to the invention offers the possibility of preparing suitable products for the manufacture of shaped articles with certain desired properties, e.g. a certain color, by applying a suspension of a solid material or a mixture of solid materials by means of which the desired property of the shaped articles can be obtained. Thus, red-colored products can be obtained by using so-called cadmium red, which consists of cadmium sulphide and cadmium selenide, as solid material in the suspension.

According to another preferred embodiment of the invention, solid polymers of olefinic hydrocarbons may be used as the solid material in the suspension. Surprisingly, the solid olefinic polymers have been found to cause a considerable rise of the polymerization rate of formaldehyde. Thus, a polymerization rate can be attained which is many times higher than the rate attained in the polymerization of formaldehyde using the inert liquid vehicle only.

Very suitable polymers for use in the abovementioned way as solid materials in the suspension are the solid polymers of e.g. ethylene, propylene, butylene or styrene, and mixtures or copolymers thereof.

The use of solid olefinic polymers has the further advantage that the final products which have a high molecular weight consist of polyformaldehyde and polyolefine. These products are new substances which may be called formaolefinic polymers, e.g. polyforma-ethylene, polyformapropylene, polyformastyrene, etc., and possess properties which are valuable in practical application. Thus, mechanical properties are better than those of polyformaldehyde while, in comparison with olefinic polymers, the processability into shaped articles is good. Obviously, the properties of these new substances depend on the amount of olefinic polymers used in respect of the amount of polyformaldehyde, while the ratio of the components may be varied with a view to producing the desired properties in practical application. Thus, polyformapropylene, for instance, may be prepared with a low polyformaldehyde content of 1–5% by weight or with a high polyformaldehyde content of 90–95% by weight, and also with any other polyformaldehyde content desired.

Furthermore, other products of high molecular weight, such as polyvinylchloride, polyacrylonitrile, or condensation products from aldehydes with phenols, amines, urea and melamine, may also be used according to the invention as solid materials in the suspension. The polymerization may also be carried out with suspensions of fibrous materials, such as ground asbestos, ground wood or paper, to give valuable final products.

The formaldehyde polymerization may also be carried out with the aid of pulverulent fillers, such as silica, e.g. in the form of the trade product "Aerosil," alumina, pulverized coal or carbon black.

For the preparation of formaldehyde polymers which do not contain other materials, it is recommended that the process according to the invention be carried out with a suspension of a solid material which may be extracted from the polymerization product with the aid of a solvent. In such a process, use may be made of such solid materials as, e.g., sodium chloride, which is extracted from the polymerization product with the aid of water, or titanium trichloride, which is extracted with the aid of an alcohol. A suspension of titanium trichloride is especially desirable as it appreciably accelerates the polymerization.

Formaldehyde polymers containing no other materials may also be obtained by using a previously prepared formaldehyde polymer as solid material in the suspension according to the invention.

The invention is illustrated but not limited by the following example:

In order to compare the influence of a number of solid materials, tests were made in which formaldehyde was polymerized under identical conditions, but with the application of different solid materials in the suspension.

The polymerization was carried out in a 3-liter reaction vessel provided with a stirrer, the temperature in the vessel being kept at 30–35° C. The solid material was suspended in 1.5 liters of heptane in the reaction vessel. Before the formaldehyde was introduced, nitrogen was passed through the reaction vessel for 30 minutes, in order to ensure an inert atmosphere.

The formaldehyde was introduced in the gaseous state, after having been freed, by being passed through a low-temperature zone (−10 to −20° C.), from impurities condensing at that temperature. The rate of introduction during the polymerization was always so controlled, that formaldehyde was just prevented from escaping from the reaction vessel.

The polymerization was stopped after 3.5 hours, with the exception of the test in which no solid material was used, said test being stopped after 100 minutes.

The results are shown in the following table wherein the left hand column lists the various solid materials used; the center column the amount of solid material, expressed in grams per liter of vehicle; and the right hand column specifies the mean polymerization rate, expressed in grams of polyformaldehyde formed per hour and per liter of vehicle.

Table

| Solid material | G./l. | Rate, g./l./h. |
|---|---|---|
| No | | 6.0 |
| Cadmium red | 6.7 | 23.0 |
| Polyethylene (low-pressure product) | 20 | 22.1 |
| Do | 5 | 20.2 |
| Polypropylene | 20 | 19.3 |
| Do | 5 | 14.0 |
| Sodium chloride | 40 | 11.2 |
| Aerosil | 6.6 | 22.4 |
| Polyformaldehyde | 34 | 23.6 |
| Do | 12.6 | 20.2 |
| Titanium trichloride | 0.6 | 24.5 |
| Carbon black | 3.3 | 12.0 |

The polymerization may further be influenced by applying catalysts dissolved in the vehicle. For this purpose, there may be used amines or other substances, such as alkyl phosphines. Suitable amine catalysts are those described in U.S. Patent 2,768,994 and it will be appreciated that the various reaction conditions described therein may be used in the present process.

The addition of the usual stabilizers and anti-oxidants has a favorable influence on the properties of the resulting final products. In the process according to the invention, such materials may be added to the suspension in which the formaldehyde is polymerized.

Furthermore, the properties of the final product may be favorably influenced, as is known in itself, by a chemical treatment in which acetylation or ether formation is effected.

Having described the invention, what is claimed as new is:

1. In a process for polymerizing formaldehyde by passing the same into an inert liquid vehicle, the improvement which comprises first adding a solid, inert, particulate material to said liquid vehicle before the passage of any monomeric formaldehyde into said vehicle and thereafter passing the formaldehyde into the resulting suspension to polymerize said formaldehyde, said solid, inert, particulate material being different from said formaldehyde.

2. The process of claim 1 wherein said solid material comprises an organic, high molecular weight, inert, particulate material.

3. The process of claim 1 wherein the formaldehyde is introduced into the suspension at a rate such that essentially no formaldehyde escapes from the suspension.

4. The process of claim 1 wherein the solid material comprises a solid polymer of an olefinic hydrocarbon.

5. The process of claim 4 wherein said polymer is a solid polymer of a member of the group consisting of ethylene and propylene.

6. The process of claim 1 wherein said solid material is colored.

7. The process of claim 1 wherein said solid is an inorganic pigment.

8. The process of claim 1 wherein the solid material is titanium trichloride.

9. A mixture of formaldehyde polymer and solid material obtained by the process of claim 1.

10. A mixture of formaldehyde polymer and solid olefinic polymer obtained by the process of claim 4.

11. The process of claim 1 wherein from 0.1 to 100 grams of solid material are used per liter of vehicle.

References Cited by the Examiner

UNITED STATES PATENTS

| | | | |
|---|---|---|---|
| 2,205,722 | 6/40 | Graves | 260—37 |
| 2,768,994 | 10/56 | MacDonald | 260—67 |
| 2,844,561 | 7/58 | Bechtold et al. | 260—67 |
| 3,030,338 | 4/62 | Aries | 260—67 |

WILLIAM H. SHORT, *Primary Examiner.*

H. N. BURSTEIN, J. R. LIBERMAN, *Examiners.*